United States Patent
Li et al.

(10) Patent No.: US 12,500,294 B2
(45) Date of Patent: Dec. 16, 2025

(54) HYDROGEN FUEL CELL FORKLIFT TRUCK WITH DISTRIBUTED ARCHITECTURE

(71) Applicants: HANGCHA GROUP CO., LTD., Zhejiang (CN); HANGCHA GROUP (TIANJIN) NEW ENERGY FORKLIFT CO., LTD., Tianjin (CN)

(72) Inventors: Yuansong Li, Zhejiang (CN); Jiannan Bao, Zhejiang (CN); Bailin Wang, Zhejiang (CN); Huaiyu Wang, Zhejiang (CN); Wenjie Guan, Zhejiang (CN); Rujun Fan, Zhejiang (CN); Minghui Li, Zhejiang (CN); Jialiang Wang, Tianjin (CN)

(73) Assignees: HANGCHA GROUP CO., LTD., Zhejiang (CN); HANGCHA GROUP (TIANJIN) NEW ENERGY FORKLIFT CO., LTD., Tianjin (CN)

( * ) Notice: Subject to any disclaimer, the term of this patent is extended or adjusted under 35 U.S.C. 154(b) by 869 days.

(21) Appl. No.: 17/826,156

(22) Filed: May 26, 2022

(65) Prior Publication Data
US 2023/0299391 A1    Sep. 21, 2023

(30) Foreign Application Priority Data
Mar. 17, 2022 (CN) .......................... 202210260908.0

(51) Int. Cl.
*H01M 16/00* (2006.01)
*B60L 50/75* (2019.01)
(Continued)

(52) U.S. Cl.
CPC .......... *H01M 16/006* (2013.01); *B60L 50/75* (2019.02); *B60L 58/33* (2019.02); *B62D 25/06* (2013.01);
(Continued)

(58) Field of Classification Search
CPC .. H01M 16/006; H01M 8/02; H01M 8/04067; H01M 8/04201; H01M 8/04701;
(Continued)

(56) References Cited

U.S. PATENT DOCUMENTS 7,000,716 B2 * 2/2006 Leifert ................ B66F 9/07572
180/65.265
7,478,698 B2 * 1/2009 Shimizu .................. B60L 1/003
180/220
(Continued)

FOREIGN PATENT DOCUMENTS

CN      201325322 Y    10/2009
CN      106828067 A    6/2017
(Continued)

OTHER PUBLICATIONS

First Office Action dated May 5, 2022 for Chinese patent application No. 202210260908.0, English translation provided by Global Dossier.
(Continued)

*Primary Examiner* — John D Walters
(74) *Attorney, Agent, or Firm* — Yue (Robert) Xu; Apex Attorneys at Law, LLP

(57) ABSTRACT

A hydrogen fuel cell forklift truck with a distributed architecture includes a frame, and, a hydrogen storage system, a fuel cell, a cooling system and an energy storage system arranged on the frame, and the fuel cell is connected with the hydrogen storage system and the energy storage system for charging the energy storage system and providing kinetic energy; the hydrogen storage system is located outside the fuel cell and exposed to the frame for supplying hydrogen to the fuel cell; the cooling system is located outside the fuel cell and connected to the fuel cell for cooling the fuel cell; the energy storage system is located outside the fuel cell and
(Continued)

connected to the fuel cell for recovering braking energy and providing kinetic energy together with the fuel cell.

8 Claims, 4 Drawing Sheets

(51) Int. Cl.
| | |
|---|---|
| *B60L 58/33* | (2019.01) |
| *B62D 25/06* | (2006.01) |
| *H01M 8/02* | (2016.01) |
| *H01M 8/04007* | (2016.01) |
| *H01M 8/04082* | (2016.01) |
| *H01M 8/04701* | (2016.01) |
| *H01M 10/052* | (2010.01) |

(52) U.S. Cl.
CPC ......... *H01M 8/02* (2013.01); *H01M 8/04067* (2013.01); *H01M 8/04201* (2013.01); *H01M 8/04701* (2013.01); *H01M 10/052* (2013.01); *H01M 2220/20* (2013.01); *H01M 2250/20* (2013.01)

(58) Field of Classification Search
CPC ...... H01M 10/052; B60L 58/33; B60L 50/75; B62D 25/06
See application file for complete search history.

(56) References Cited

U.S. PATENT DOCUMENTS

| | | | | |
|---|---|---|---|---|
| 9,356,445 | B2* | 5/2016 | Ge | H01M 8/0491 |
| 11,104,231 | B2* | 8/2021 | Froelich | B60L 58/21 |
| 11,117,458 | B2* | 9/2021 | Op De Beeck | B60K 15/07 |
| 11,273,717 | B2* | 3/2022 | Miyaki | H01M 8/2475 |
| 11,312,244 | B2* | 4/2022 | Miyaki | B60L 50/50 |
| 11,479,130 | B2* | 10/2022 | Yeon | B62D 21/03 |

| | | | |
|---|---|---|---|
| 2004/0129466 | A1 | 7/2004 | Leifert |
| 2006/0040144 | A1 | 2/2006 | Shimizu et al. |
| 2015/0295401 | A1 | 10/2015 | Ge |
| 2015/0372322 | A1* | 12/2015 | Shimoyana ......... B60K 15/063 429/515 |
| 2020/0148075 | A1 | 5/2020 | Op De Beeck et al. |
| 2020/0238837 | A1 | 7/2020 | Miyaki et al. |
| 2020/0238839 | A1 | 7/2020 | Miyaki et al. |
| 2021/0138914 | A1 | 5/2021 | Yeon et al. |

FOREIGN PATENT DOCUMENTS

| | | |
|---|---|---|
| CN | 107161016 A | 9/2017 |
| CN | 207637907 U | 7/2018 |
| CN | 108502806 A | 9/2018 |
| CN | 211000925 U | 7/2020 |
| CN | 211605287 U | 9/2020 |
| CN | 211605293 U | 9/2020 |
| CN | 211617445 U | 10/2020 |
| CN | 212303720 U | 1/2021 |
| CN | 112440764 A | 3/2021 |
| CN | 112848927 A | 5/2021 |
| CN | 113022332 A | 6/2021 |
| CN | 113085590 A | 7/2021 |
| CN | 113479075 A | 10/2021 |
| CN | 113479130 A | 10/2021 |
| CN | 214356314 U | 10/2021 |
| CN | 214477558 U | 10/2021 |
| CN | 215553625 U | 1/2022 |
| DE | 10242619 A1 | 3/2004 |
| JP | 2020-43056 A | 3/2020 |
| JP | 2020-117147 A | 8/2020 |
| JP | 2020-117148 A | 8/2020 |

OTHER PUBLICATIONS

Search Report dated Nov. 15, 2022 for European patent application No. 22174136.6.

* cited by examiner

HYDROGEN FUEL CELL FORKLIFT TRUCK WITH DISTRIBUTED ARCHITECTURE

CROSS REFERENCE TO RELATED APPLICATIONS

This application claims the priorities to Chinese patent application No. 202210260908.0, titled "HYDROGEN FUEL CELL FORKLIFT TRUCK WITH DISTRIBUTED ARCHITECTURE", filed with the China National Intellectual Property Administration Mar. 17, 2022, the entire disclosure of which is hereby incorporated by reference.

FIELD

The present application relates to the technical field of a forklift, and in particular to a forklift having a hydrogen fuel cell forklift truck with a distribute architecture.

BACKGROUND

At present, with the implementation of energy saving and emission reduction policies, new energy forklifts will gradually replace internal combustion forklifts and become the focus of the future development of the forklift industry.

In the conventional technology, a fuel cell system of a new energy forklift adopts an integrated structure, that is, the power generation system, the energy storage battery system, the cooling system and the air filter are all mounted in one fuel cell box. This structure is similar to the PACK structure of lithium battery. However, due to the great differences between the lithium battery system and the fuel cell system, the installation and maintenance process of the fuel cell system is rather cumbersome and often inconvenient in use. At the same time, the fuel cell system also has some safety problems. For example, since the hydrogen storage system is located in the fuel cell, safety hazards may occur when hydrogen leaks.

SUMMARY

A hydrogen fuel cell forklift truck with a distribute architecture is provided, which may solve the tedious technical problems in the installation and maintenance process, and is convenient and reliable to use. At the same time, the forklift may also effectively eliminate potential safety hazards caused by hydrogen leakage.

The hydrogen fuel cell forklift truck with the distribute architecture is provided according to the present application, which includes a frame, and, a hydrogen storage system, a fuel cell, a cooling system and an energy storage system arranged on the frame, in which
    the fuel cell is connected with the hydrogen storage system and the energy storage system for charging the energy storage system and providing kinetic energy;
    the hydrogen storage system is located outside the fuel cell and exposed to the frame for suppling hydrogen to the fuel cell;
    the cooling system is located outside the fuel cell and connected to the fuel cell for cooling the fuel cell;
    the energy storage system is located outside the fuel cell and connected to the fuel cell for recovering braking energy and providing kinetic energy together with the fuel cell.

In some embodiments, a balance weight is provided on the frame, and the hydrogen storage system is located above the balance weight.

In some embodiments, the frame is further provided with a protective cover above the balance weight. A space for accommodating the hydrogen storage system is formed between the protective cover and the frame, and the protective cover is detachably connected to the frame.

In some embodiments, the cooling system is located below the hydrogen storage system, and the balance weight is provided with an air outlet;
    the cooling system includes:
    a heat dissipation fan, arranged facing the air outlet, for convection heat dissipation with the air outlet.

In some embodiments, the hydrogen fuel cell forklift truck with the distribute architecture further includes:
    an air intake system arranged on the frame and exposed to the frame, the air intake system is connected with the fuel cell for supplying air to make the fuel cell react and provide kinetic energy.

In some embodiments, the air intake system includes:
    a primary air filter;
    an air suction pipe provided with a secondary air filter;
    an air intake pipe, in which two ends of the air intake pipe are respectively connected with the air suction pipe and the fuel cell, and the primary air filter is arranged at the connection between the air suction pipe and the air intake pipe.

In some embodiments, the frame includes:
    a vehicle body provided with a hydrogen storage system, a fuel cell, a cooling system and an energy storage system;
    a roof guard frame located above the vehicle body;
    a leg connecting the vehicle body and the roof guard frame, and the secondary air filter is arranged at a position of the leg near the roof guard frame.

In some embodiments, the frame is provided with a mounting assembly, and the mounting assembly is detachably provided with a fixing piece, and the fixing piece is used for fixing the hydrogen storage system on the mounting assembly.

In some embodiments, the fuel cell and the energy storage system are connected by cables.

In some embodiments, a sliding block is arranged on the frame, and the energy storage system may slide relative to the sliding block. The energy storage system is further provided with a handle and a charging port.

Compared with the above background technology, according to the hydrogen fuel cell forklift truck with the distribute architecture provided by the present application, the hydrogen storage system, the cooling system and the energy storage system are respectively mounted at different positions of the frame in a distributed architecture, and the integrated setting mode in related technologies is no longer used. In this way, the installation and maintenance of each component is relatively simple, reliable heat dissipation of each component can be ensured, and the working efficiency and service life of the energy storage system can also be effectively guaranteed. Meanwhile, the hydrogen storage system is exposed to the frame, and the dismantling process of the hydrogen storage system is convenient, which facilitates the annual inspection and maintenance of the hydrogen storage system. In addition, because the hydrogen storage system is located outside the fuel cell, it may spread to the environment to avoid potential safety hazards when the hydrogen in the hydrogen storage system leaks.

BRIEF DESCRIPTION OF THE DRAWINGS

To describe the technical solutions in the embodiments of the present application or in the conventional technology more clearly, the accompanying drawings required for describing the embodiments or the conventional technology are briefly introduced hereinafter. Apparently, the accompanying drawings in the following description show merely the embodiments of the present application, and a person of ordinary skill in the art can derive other drawings from these accompanying drawings without creative efforts.

Figure 1:
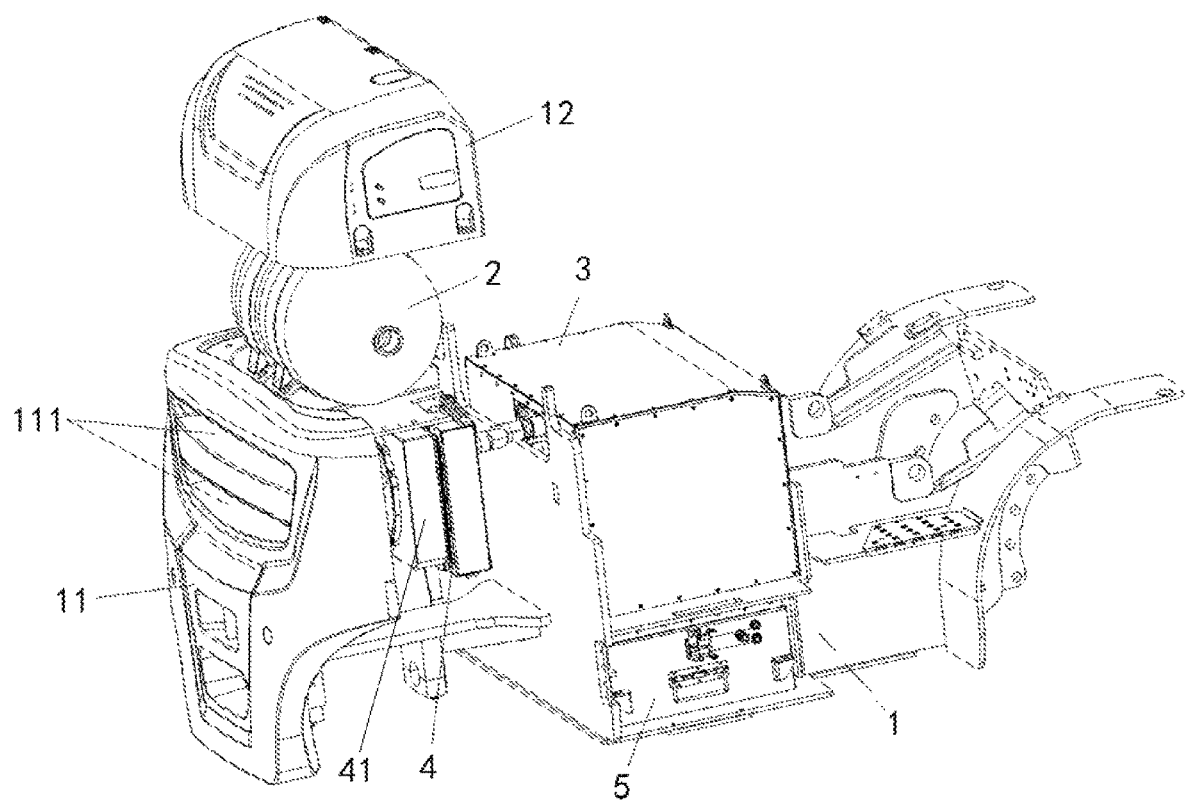
FIG. 1 is a schematic structural diagram of a hydrogen fuel cell forklift truck with a distribute architecture provided by an embodiment of the present application.
Figure 2:
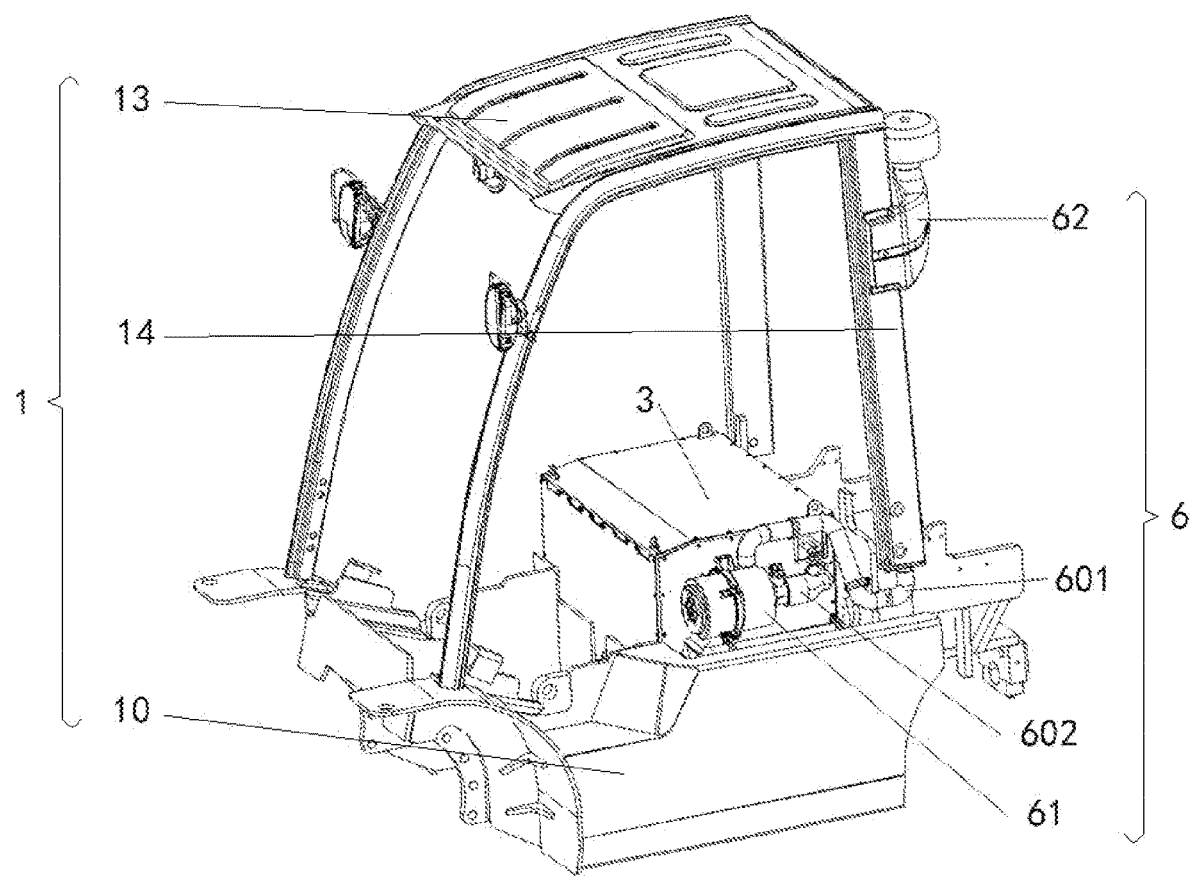
FIG. 2 is a schematic structural diagram of another hydrogen fuel cell forklift truck with a distribute architecture provided by an embodiment of the present application.
Figure 3:
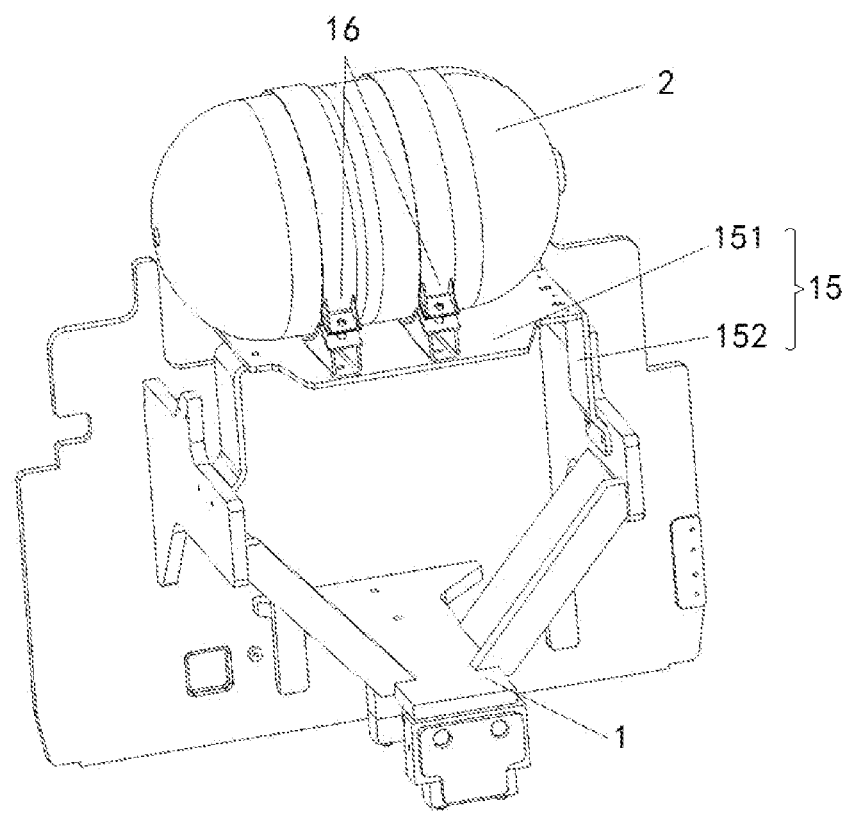
FIG. 3 is a schematic structural diagram of an installation position of a hydrogen storage system of a hydrogen fuel cell forklift truck with a distribute architecture provided by an embodiment of the present application.

REFERENCE NUMERALS IN THE DRAWINGS 1 frame; 10 vehicle body; 11 balance weight; 111 air outlet; 12 protective cover; 13 roof guard frame; 14 leg; 15 mounting assembly; 151 mounting plate; 152 side plate; 16 fixing piece; 17 sliding block;
2 hydrogen storage system;
3 fuel cell;
4 cooling system; 41 cooling fan;
5 energy storage system; 51 handle; 52 charging port;
6 air intake system; 601 air suction pipe; 61 primary air filter; 602 air intake pipe; 62 secondary air filter;
7 cable.

DETAILED DESCRIPTION OF THE EMBODIMENTS

Technical solutions in the embodiments of the present disclosure are clearly and completely described below in conjunction with the drawings of the embodiments of the present disclosure. Apparently, the embodiments described in the following are only some embodiments of the present disclosure, rather than all of the embodiments. Any other embodiments obtained by those skilled in the art based on the embodiments in the present disclosure without any creative effort shall fall within the protection scope of the present disclosure.

In order to make the person skilled in the art have a better understanding of solutions of the present disclosure, the present disclosure is described in further detail hereinafter, in conjunction with the drawings and embodiments.

A hydrogen fuel cell forklift truck with a distribute architecture provided by the present application, as shown in FIG. 1 of the description, including: a frame 1, a hydrogen storage system 2, a fuel cell 3, a cooling system 4 and an energy storage system 5. The frame 1 is the main part of the hydrogen fuel cell forklift truck with the distribute architecture, and the hydrogen storage system 2, fuel cell 3, cooling system 4 and energy storage system 5 are all mounted based on the frame 1.

The hydrogen storage system 2 is exposed to the frame 1. Of course, in order to protect the hydrogen storage system 2, a protective device such as a protective cover 12 may also be provided on the frame 1. The protection device is detachable relative to the frame 1, and the hydrogen storage system 2 is also detachably connected with the frame 1, so that the hydrogen storage system 2 can be conveniently removed from the frame 1 and corresponding maintenance work can be performed on the hydrogen storage system 2.

The fuel cell 3 is arranged on the frame 1 and located outside the hydrogen storage system 2. That is, the hydrogen storage system 2 and the fuel cell 3 are set in a separate type, and the hydrogen storage system 2 is connected with the fuel cell 3. The fuel cell 3 utilizes the hydrogen in the hydrogen storage system 2 to perform a chemical reaction, thereby providing kinetic energy to the forklift.

The cooling system 4 is arranged on the frame 1 and is located outside the fuel cell 3. The cooling system 4 is connected to the fuel cell 3, and the fuel cell 3 is cooled by the cooling system 4; the hydrogen storage system 2, the fuel cell 3 and the cooling system 4 adopt a distributed architecture, and are respectively mounted at different positions of the frame 1, so that the installation and maintenance of each component can be implemented conveniently and quickly.

The energy storage system 5 is arranged on the frame 1 and is located outside the fuel cell 3. The energy storage system 5 is connected to the fuel cell 3, and the energy storage system 5 and the fuel cell 3 together provide kinetic energy and assist functions such as energy recovery and storage during vehicle braking. The energy storage system 5 is provided independently of the fuel cell 3, and the structural size of the energy storage system 5 can be set according to requirements, which is not limited by the size of the fuel cell 3.

Figure 4:
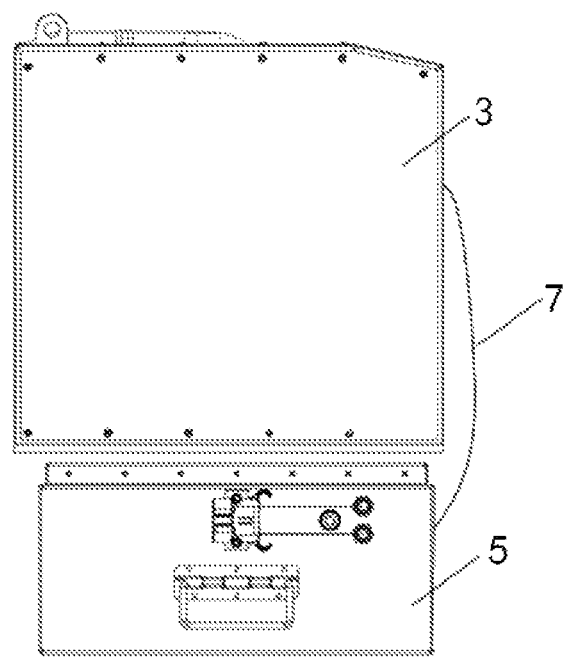
FIG. 4 is a schematic diagram of a connection between a fuel cell and an energy storage system of a hydrogen fuel cell forklift truck with a distribute architecture provided by an embodiment of the present application.
Figure 5:
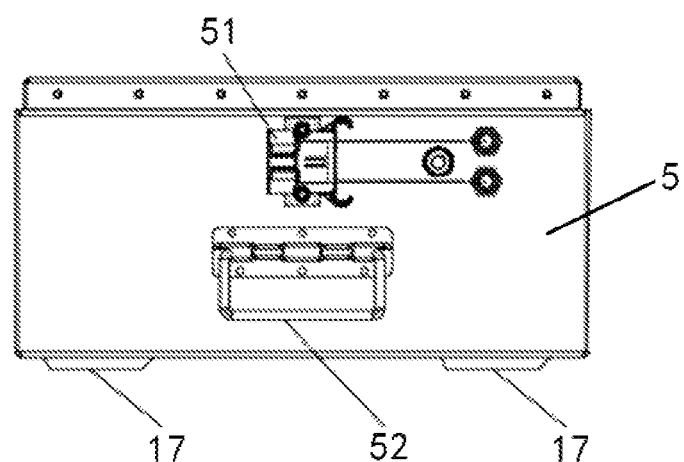
FIG. 5 is a schematic structural diagram of an energy storage system of a hydrogen fuel cell forklift truck with a distribute architecture provided by an embodiment of the present application.

In some embodiments, referring to FIG. 4, the fuel cell 3 and the energy storage system 5 are connected by a cable 7. The fuel cell 3 has a power generation device inside, so that the fuel cell 3 can be used to charge the energy storage system 5, and the fuel cell 3 may also provide kinetic energy to the vehicle.

The frame 1 is provided with a sliding block 17, and the energy storage system 5 may slide relative to the sliding block 17, that is, the energy storage system 5 is movably arranged on the frame 1, so that it is convenient to pull the energy storage system 5 out of the frame 1.

The energy storage system 5 may be specifically a lithium battery, and is preferably arranged at the bottom of the vehicle frame 1, that is, below the fuel cell 3, and adopts a pull-out structure to facilitate the removal of the energy storage system 5. Further, the energy storage system 5 may be further provided with a handle 51 and a charging port 52.

A pulling force can be conveniently applied to the energy storage system 5 by using a handle 51, that is, the energy storage system 5 adopts a pull-out structure, which is more convenient to maintain; in addition, the charging port 52 of the energy storage system 5 can be used to recharge the energy storage system 5 at any time. Meanwhile, because the energy storage system 5 is placed outside the fuel cell 3, thus, the energy storage system 5 may not be affected by the working temperature of the fuel cell 3, further improving the working efficiency of the energy storage system 5.

In some embodiments, the frame 1 may be provided with a balance weight 11, which is usually located at the rear of the frame 1. The front part of the frame 1 is a fork, the hydrogen storage system 2 is located above the balance weight 11, and the hydrogen storage system 2 includes a hydrogen storage bottle. The hydrogen storage bottle is located above the balance weight 11, which is convenient to disassemble.

The frame 1 may be further provided with a protective cover 12. A space for accommodating the hydrogen storage system 2 is formed between the protective cover 12 and the frame 1, and the protective cover 12 is detachably connected to the frame 1; the hydrogen storage system 2 is protected by a protective cover 12. When the hydrogen storage bottle needs annual inspection or maintenance, it is only necessary to remove the protective cover 12, and then remove the hydrogen storage system 2 from the frame 1. In the process of removing the hydrogen storage system 2, the structure of the fuel cell 3 may not be greatly affected, which is very convenient.

Ventilation ports, hydrogen storage bottle exhaust ports and hydrogen filling ports, etc. can be designed on the protective cover 12. The protective cover 12 can protect the hydrogen storage bottle from the impact of external forces, and can also ensure that hydrogen leakage is easy to diffuse, preventing potential safety hazards due to hydrogen accumulation. Hydrogenation ports can be arranged on the left and right sides, which is very convenient for hydrogenation.

Further, the frame 1 is provided with a mounting assembly 15, and the mounting assembly 15 is detachably provided with a fixing piece 16, and the fixing piece 16 is used for fixing the hydrogen storage system 2 on the mounting assembly 15.

The mounting assembly 15 may include a mounting plate 151 and two side plates 152, the two side plates 152 are placed vertically, the mounting plate 151 is located above the two side plates 152 and is arranged horizontally. In order to improve the structural reliability, both the mounting plate 151 and the two side plates 152 can be connected to the frame 1. A fixing piece 16 is detachably provided on the mounting plate 151, the hydrogen storage system 2 is fixed by the fixing piece 16, and the hydrogen storage system 2 is fixed on the mounting plate 151.

When the hydrogen storage system 2 needs annual inspection or maintenance, first remove the protective cover 12, then remove the fixing piece 16 from the mounting plate 151, and finally remove the hydrogen storage system 2 from the frame 1, thus completing the removal of the hydrogen storage system 2. When the hydrogen storage system 2 is mounted, the sequence is reversed, and is not expanded here.

The cooling system 4 can be arranged below the hydrogen storage system 2, and the balance weight 11 is provided with an air outlet 111; the cooling system 4 includes a cooling fan 41, the cooling fan 41 is disposed facing the air outlet 111, and the cooling fan 41 is used for convection heat dissipation with the air outlet 111.

The cooling system 4 is placed below the rear of the forklift, that is, below the hydrogen storage system 2, and mainly includes the cooling fan 41, the cooling water tank and the expansion water tank and other module parts. The water inlet and outlet pipes of the cooling system 4 are respectively connected with the water inlet and outlet pipes of the fuel cell 3, and the exhaust pipes of the cooling system 4 are connected with the expansion water tank. The cooling fan 41 discharges air and dissipates heat through the air outlet 111 at the rear of the balance weight 11.

The cooling system 4 is fixed on the frame 1 and is located at the rear of the frame 1. Since there is no other heat source here and the internal ambient temperature is low, the balance weight 11 is provided with an air outlet 111, and an air duct is designed on the balance weight 11 and the frame 1 to make the heat dissipation effect better, thereby improving the working efficiency of the fuel cell 3; the wind direction of the cooling fan 41 is backward, which may not affect pedestrians on both sides of the forklift. The fan motor of the cooling fan 41 can be a non-explosion-proof motor, and there is no hydrogen accumulation at this position, so there is no safety hazard due to the accumulation of hydrogen.

The hydrogen fuel cell forklift truck with the distribute architecture provided according to the present application further includes an air intake system 6. The air intake system 6 is arranged on the frame 1 and is exposed to the frame 1. The air intake system 6 is connected with the fuel cell 3, and is used for supplying air to make the fuel cell 3 react and provide kinetic energy.

In some embodiments, the air intake system 6 includes an air suction pipe 601 and an air intake pipe 602 that communicate with each other, and the air intake suction 601 is provided with a secondary air filter 62, two ends of the air intake pipe 602 are respectively connected with the air suction pipe 601 and the fuel cell 3, and the primary air filter 61 is arranged at the connection between the air suction pipe 601 and the air intake pipe 602. It can be seen that the primary air filter 61 and the secondary air filter 62 are located outside the fuel cell 3. The air is secondarily filtered by the primary air filter 61 and the secondary air filter 62 to obtain clean air. The clean air enters the fuel cell 3 for reaction, generating kinetic energy.

In an embodiment, the frame 1 includes: a vehicle body 10, a roof guard frame 13 and legs 14. A hydrogen storage system 2, a fuel cell 3, a cooling system 4 and an energy storage system 5 are mounted on the vehicle body 10, and a roof guard frame 13 is located above the vehicle body 10; the leg 14 connects the vehicle body 10 with the roof guard frame 13, and the primary air filter 61 is arranged at the position where the leg 14 is close to the roof guard frame 13.

The secondary air filter 62 is fixed on the upper part of the leg 14, the primary air filter 61 is fixed on the side of the fuel cell 3, and the primary air filter 61 can be maintained by opening the cover, which is very convenient; in the process of use, firstly, the air is taken in through the secondary air filter 62 on the upper part of the leg 14, and then the preliminarily filtered air reaches the primary air filter 61 through the air suction pipe 601 for further filtration. Finally, clean air is input into the fuel cell 3 through the air intake pipe 602 to participate in the reaction, thereby improving the working efficiency and service life of the fuel cell 3. In addition, the primary air filter 61 and the secondary air filter 62 are externally arranged, which facilitates timely maintenance of the air filter and improves the working efficiency and service life of the fuel cell 3.

In the hydrogen fuel cell forklift truck with the distribute architecture designed in this way, some subsystems in the hydrogen fuel cell system that have great influence on each other are independently arranged, so that they can play a better role, improve the working efficiency and reliability of the whole vehicle, and prolong the working life of the whole vehicle.

Specifically, the hydrogen storage system 2 is externally arranged. When the hydrogen bottle needs to be disassembled during the annual inspection and maintenance of the hydrogen storage bottle, it is only necessary to disassemble the protective cover 12 and the fixing piece 16, which may not have a great impact on the structure of the fuel cell 3, so it is very convenient in terms of annual inspection and maintenance. Meanwhile, when the hydrogen in the hydrogen storage bottle leaks, it is easier to diffuse outward, which avoids the accumulation of hydrogen, and prevents potential safety hazards due to the accumulation of hydrogen.

When the cooling system 4 is externally arranged, the ambient temperature of the cooling tank and the cooling fan 41 is lower than the internal ambient temperature of the fuel cell 3. Coupled with the optimized air duct, the whole cooling system has better cooling effect, which greatly improves the working efficiency and service life of the stack. The wind direction of the cooling system 4 is rearward, which may not affect the pedestrians on both sides of the forklift.

In this application, the energy storage system 5 is externally arranged, thus the energy storage system 5 may not be affected by the internal environment temperature of the fuel cell 3 when working, and the external arrangement has better heat dissipation effect. In addition, the use of the side-pull structure not only improves the working efficiency and service life of the energy storage system 5, but also improves the maintenance speed of the energy storage system 5.

The hydrogen fuel cell forklift truck with the distribute architecture provided by the present application has been described in detail hereinbefore. Principles and embodiments of the present disclosure are described herein through specific examples. Description of the above embodiments is merely used to facilitate understanding the method and concept of the present disclosure. It should be noted that several improvements and modifications can be made to the present application by those skilled in the art without departing from the principles of the present disclosure. These improvements and modifications shall fall within the scope of the claims of the present application.

The invention claimed is:

1. A hydrogen fuel cell forklift truck with a distribute architecture, comprising a frame, and, a hydrogen storage system, a fuel cell, a cooling system and an energy storage system arranged on the frame, wherein
   the fuel cell is connected with the hydrogen storage system and the energy storage system for charging the energy storage system and providing kinetic energy;
   the hydrogen storage system is located outside the fuel cell and exposed to the frame for supplying hydrogen to the fuel cell;
   the cooling system is located outside the fuel cell and connected to the fuel cell for cooling the fuel cell; and
   the energy storage system is located outside the fuel cell and connected to the fuel cell for recovering braking energy and providing kinetic energy together with the fuel cell,
   wherein a balance weight is provided on the frame, and the hydrogen storage system is located above the balance weight,
   wherein the cooling system is located below the hydrogen storage system, and the balance weight is provided with an air outlet;
   wherein the cooling system comprises:
   a heat dissipation fan, arranged facing the air outlet, for convection heat dissipation with the air outlet.

2. The hydrogen fuel cell forklift truck with the distribute architecture according to claim 1, wherein the frame is further provided with a protective cover above the balance weight, a space for accommodating the hydrogen storage system is formed between the protective cover and the frame, and the protective cover is detachably connected to the frame.

3. The hydrogen fuel cell forklift truck with the distribute architecture according to claim 1, further comprising:
   an air intake system arranged on the frame and exposed to the frame, wherein the air intake system is connected with the fuel cell, and is used for supplying air to make the fuel cell react and provide kinetic energy.

4. The hydrogen fuel cell forklift truck with the distribute architecture according to claim 3, wherein the air intake system comprises:
   a primary air filter;
   an air suction pipe provided with a secondary air filter;
   an air intake pipe, wherein two ends of the air intake pipe are respectively connected with the air suction pipe and the fuel cell, and the primary air filter is arranged at the connection between the air suction pipe and the air intake pipe.

5. The hydrogen fuel cell forklift truck with the distribute architecture according to claim 4, wherein the frame comprises:
   a vehicle body provided with a hydrogen storage system, a fuel cell, a cooling system and an energy storage system;
   a roof guard frame located above the vehicle body;
   a leg connecting the vehicle body and the roof guard frame, in which the secondary air filter is arranged at a position of the leg near the roof guard frame.

6. The hydrogen fuel cell forklift truck with the distribute architecture according to claim 1, wherein the frame is provided with a mounting assembly, and the mounting assembly is detachably provided with a fixing piece, and the fixing piece is used for fixing the hydrogen storage system on the mounting assembly.

7. The hydrogen fuel cell forklift truck with the distribute architecture according to claim 1, wherein the fuel cell and the energy storage system are connected by a cable.

8. The hydrogen fuel cell forklift truck with the distribute architecture according to claim 1, wherein a sliding block is arranged on the frame, and the energy storage system is slidable relative to the sliding block, the energy storage system is further provided with a handle and a charging port.

* * * * *